No. 739,032. PATENTED SEPT. 15, 1903.
W. N. STEWART.
ELECTRIC RAILWAY.
APPLICATION FILED NOV. 24, 1902.
NO MODEL. 2 SHEETS—SHEET 2.

Witnesses
John Louis Lotsch
Jno Robt Taylor

Inventor
Willis N. Stewart,
By
Attys.

No. 739,032. Patented September 15, 1903.

UNITED STATES PATENT OFFICE.

WILLIS N. STEWART, OF LONDON, ENGLAND, ASSIGNOR OF ONE-HALF TO HERMAN ERNEST DICK, OF LONDON, ENGLAND.

ELECTRIC RAILWAY.

SPECIFICATION forming part of Letters Patent No. 739,032, dated September 15, 1903.

Application filed November 24, 1902. Serial No. 132,672. (No model.)

*To all whom it may concern:*

Be it known that I, WILLIS NELSON STEWART, a citizen of the United States, residing at London, England, have invented certain new and useful Improvements in or Connected with Electric Railways, of which the following is a full, clear, and exact description.

Electric railways and tramways have hitherto been operated from current derived either from overhead wires, third rails, or underground conduits containing suitable conductors, all continuous with the line and supplied with current from suitably-located generators or from secondary or storage batteries carried on the train or tram-car itself. In some cases it has been customary to use current from continuous conductors in one portion of the line only and from batteries in another portion of the line only, as in the case of tramways, where batteries have been used in the central parts of a city, where overhead conductors are objectionable, and overhead wires in the suburban districts.

The hereinafter-described system is more particularly adapted for use on lines having a great amount of traffic, where it is desired to furnish a service at short intervals of time. On such lines it is desirable that a quick rate of acceleration shall be attained in starting trains from stations, and that the full maximum rate of speed permissible shall be maintained over the entire line irrespective of inclines or curves therein. This object has not hitherto been fully attained by the systems now in use.

It is proposed to employ batteries composed of finely-divided metals or oxids of metals in an unalterable alkaline electrolyte, as they are not injured by overcharge or rapid discharge, while their weight per unit of energy is much less than that of the lead-acid cells hitherto employed. It is therefore proposed to use these batteries carried by the train itself as a source of power on those portions of the line which are level or comparatively level, while an auxiliary supply, derived from stationary sources of supply suitably located, is furnished to replace or supplement the action of the batteries at stations, inclines, and curves. The sectional conductors, from which the auxiliary supply is derived, are not in electrical connection with one another.

The invention is illustrated in the accompanying drawings, in which—

Figure 1:
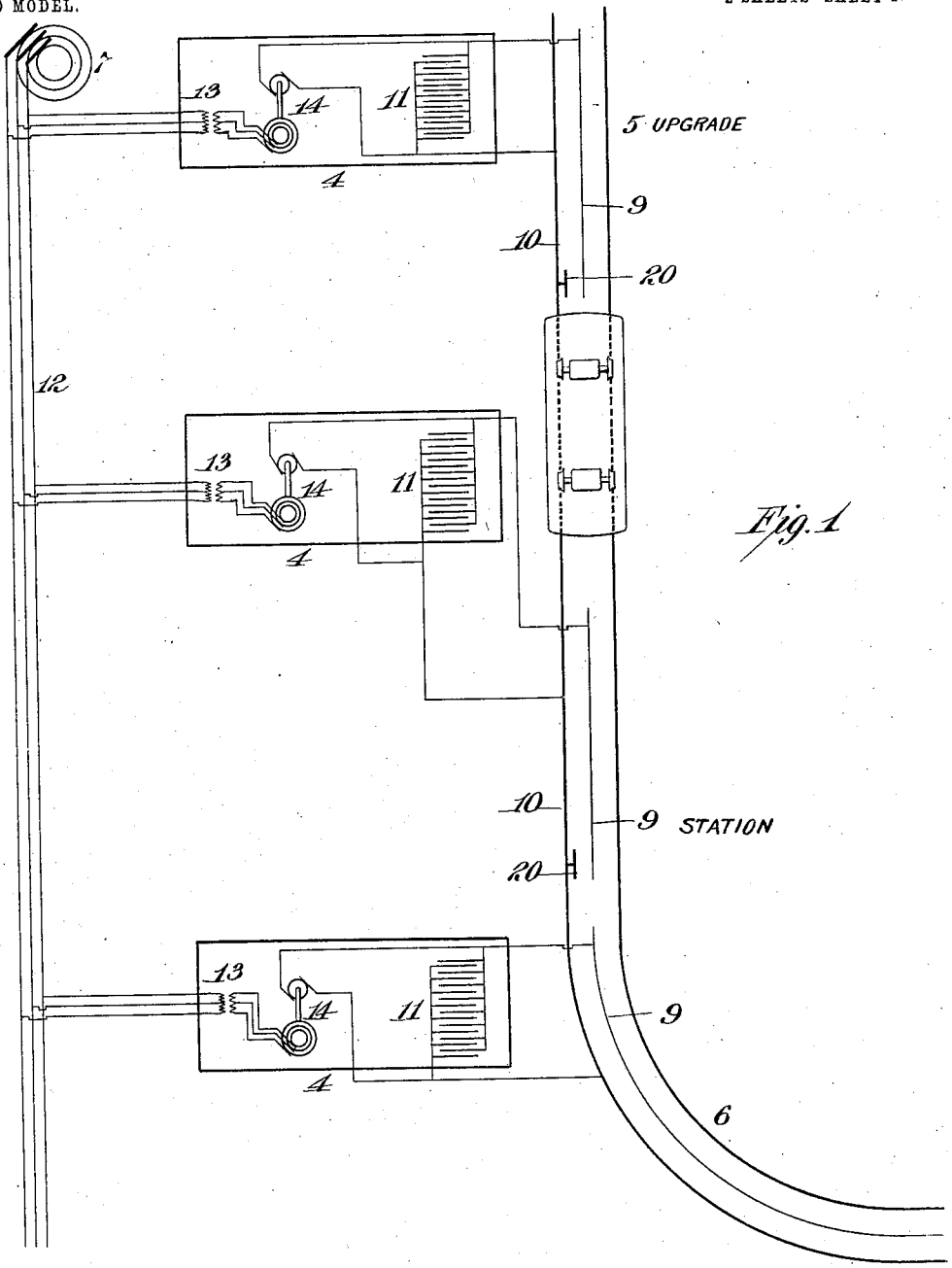
Figure 2:
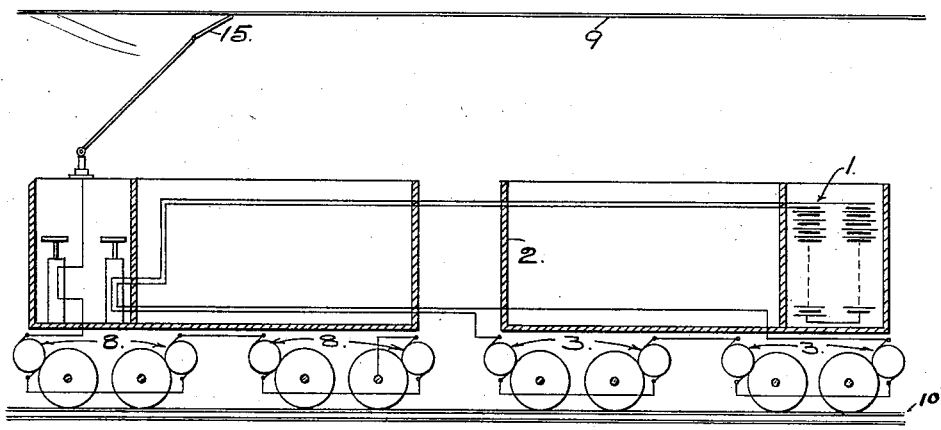
Figure 3:
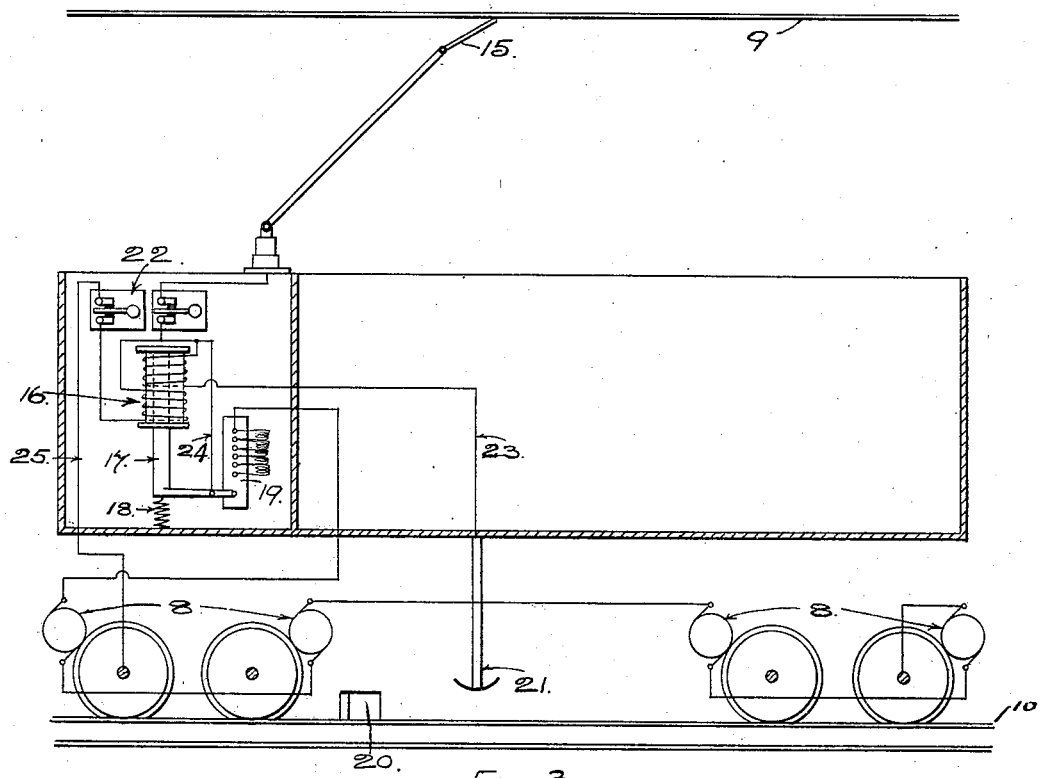

Figure 1 is a diagrammatic view of an electric-railway system constructed in accordance with said invention. Fig. 2 is a diagrammatic view of two cars suitable for said system. One of said cars may contain a number of seats or it may simply be a special car to carry the batteries and propel the carriages. Fig. 3 is a diagrammatic view of a car, showing a method of automatically connecting the auxiliary motors with the auxiliary sources of supply.

The system proposed may be more particularly described as follows: Secondary batteries 1 of the said alkaline type are carried on the train itself or on a special car 2, forming part of the train, and are so located as to be readily removable for examination or recharging. These batteries 1 have only sufficient capacity to propel the train through motors 3, actuated thereby, at normal speed on level or nearly level portions of the track. To obtain a quick rate of acceleration in starting trains from stations 4 and to preserve the normal speed on rising gradients 5 and on curves 6, a great increase of power over that derived from the batteries is necessary, and this I propose to secure by the use of auxiliary sources of supply 7, suitably located and in connection only with train-motors 8 at stations 4, up gradients 5, and curves 6 through short lengths of suitable conductors 9 at such stations, inclines, or curves, the return-circuit to the auxiliary sources of supply being carried by suitable conductors, such as bonded track-rails 10, in the usual manner. The auxiliary sources of supply may be derived from auxiliary generators, which may be driven in any desired manner or from storage batteries. The operation of such a system would be as follows: On starting from a station 4 the train-motors 8, or a portion of them, would receive current from the auxiliary sources of supply 7 through the sectional conductors 9, the battery-current being used on those motors 3, connected thereto, to increase the effective power, if required. The combined power from the stationary sources of supply 7 and storage battery 1 or from the stationary sources of supply only, if so desired, should be sufficient to give the train a quick rate of acceleration. On leaving the station the short length of sectional conductor 9 would be passed, when the train movement would be continued by power derived from the battery 1 only and the motors 3, actuated thereby, until an up gradient 5 or curve 6 is encountered, when another sectional condctor 9, corresponding in length to that of the gradient or curve, would be encountered, from which extra power would be derived to maintain the normal speed of the train. Thus by a combination of battery-power carried on the train itself with that furnished by the stationary sources of supply 7 the train may be quickly started from a state of rest and maintained at full speed over gradients and curves without unduly taxing the capacity of the battery carried.

To supplement the action of the stationary generators 7 and to give them a constant load factor at all times, stationary batteries 11 may be used in connection therewith, located at stations, gradients, or curves and in electrical connection with said generators 7 in such manner that when no train is passing the section or sections of conductors 9 supplied by such generators 7 the current generated thereby may be absorbed by the batteries 11, acting as reservoirs or reserves of power.

In the operation of the system all the motors on the train may be so arranged as to receive current from either the battery 1 or auxiliary generators 7, the same being of like voltage, or some of the motors, 3, may be so connected as to receive current from the battery 1 only, and others, 8, from the auxiliary generators 7 only, the voltage being different. In this case a comparatively low voltage, as from seventy-five to one hundred volts, may be used for the motors 3, actuated by the batteries carried by the train, as the best results are obtained from these batteries 1 when used with large current and low voltage, while a higher voltage, as from five hundred to six hundred volts, may be used for the motors actuated from the auxiliary generators 7, as the cost of sectional conductors is greatly reduced by using a relatively small current and high voltage.

Fig. 1 shows an auxiliary generator 7 coupled up to a three-phase-transmission line 12, which latter, through a step-down transformer 13 and a motor-transformer 14, charges the stationary batteries 11, connected to the sectional conductors 9, the return connection being through bonded track-rails 10. The car is provided with a Siemens sliding bow 15 or other suitable connection for taking current from the sectional conductors.

Although in Fig. 1 a single generator is shown supplying energy to three stationary storage batteries, it will be understood that each stationary storage battery or each sectional conductor may be supplied with electrical energy direct from its own generator.

In the operation of this system it is desirable that means should be provided whereby the train-motors may be placed automatically in connection with the sectional conductors when these latter are reached in order that the storage battery carried by the train may not be overtaxed on up gradients or curves by the failure or neglect of the motorman to utilize the auxiliary supply. For this purpose I place on each train, as shown diagrammatically at Fig. 3, a solenoid-magnet 16, so connected between the sectional conductor 9 and the return-circuit 10 through the wheels that when a train reaches a length of sectional conductor 9 a circuit will be established through the solenoid 16, causing its core 17 to be drawn inward against the action of a spring 18, the circuit being from the sectional conductor 9 through the contact 15 and manually-operated switch 22 and the solenoid 16, thence to the wheels and return-circuit through the conductor 25. Thus whenever the switch 22 is closed a current will pass from the line and the return-circuit, energizing the solenoid, the core 17 of which is also connected to the line by the conductor 24, the core 17 or an extension thereof forming part of the controller 19, the whole being so arranged that when the solenoid 16 is energized the controller 19 will be elevated and the motors 8 thus put into circuit. Near the end of the sectional conductor 9 is placed a short length of rail 20 in electrical connection with the return-circuit 10, and a contact spring or shoe 21 is attached to the train in such manner that when the train is about to leave the sectional conductor 9 another circuit is established through the solenoid 16 by means of the conductor 23 and the spring or shoe 21 and thence to the short length of rail 20, this circuit passing around the solenoid 16 in the opposite direction to the first one. The effect of this differential winding is to demagnetize the solenoid-core 17, when it will return to its original position through the action of the spring 18, thus operating the controller 19 and moving it in the reverse direction, which will shut off the current in the auxiliary motors 8. A manually-operated switch 22 is provided and is so arranged that the main and solenoid circuit, or either, may be broken when the train is at rest. The controller 19, if desired, may be manually operated.

The advantages claimed for this system are as follows: Each train constitutes a self-contained unit, carrying sufficient power to propel itself irrespective of possible interruptions in the auxiliary generators or source of supply, thus avoiding total stoppage of the whole or part of a system. As a relatively small weight of battery is sufficient to propel a train at normal speed on level portions of the line, the first cost of the same is not excessive, while the total train weight to be propelled over up gradients and curves is not unduly increased. As conductors are required only in short sections at stations, up gradients, or curves, there is a great saving in the cost of construction over a line requiring continuous conductors. As the trains themselves carry a portion of the power necessary for their operation and as auxiliary generators are used only to supply current at portions of the line, these generators and their auxiliary apparatus may be few in number and of comparatively small size, thus saving in first cost. As the train-batteries may be recharged at central or terminus stations directly from stationary generators, there is a saving in the transmission and transformation of energy over a system in which the total energy necessary is generated at central stations, transmitted over the entire line, and transformed to suit the train requirements, as is customary in existing systems. The use of stationary storage batteries along the line as reservoirs of power reduces the total amount of primary generating apparatus necessary and is an efficient safeguard against delays resulting from breakdowns in the same or the failure of transmission-lines or transforming apparatus. As overhead conductors or third rails are used only over relatively short sections of the line, there is less liability to interruption in the service from accidents thereto, while there is less liability of leakage of current to earth therefrom.

What I claim as my invention is—

1. In an electric-railway system, the combination with the train, of a secondary or storage battery thereon, train-motors in electrical connection with the battery, auxiliary sources of electrical supply located at certain points on the line where extra power is required, auxiliary motors on the train, and connections between such motors and the auxiliary sources of supply, substantially as set forth.

2. In an electric-railway system, the combination with the train, of a secondary or storage battery thereon, train-motors in electrical connection with the battery, auxiliary sources of electrical supply located at certain points on the line where extra power is required, auxiliary motors on the train and sectional conductors forming connections between such motors and the auxiliary sources of supply, substantially as set forth.

3. In an electric-railway system, the combination with a train, of a secondary or storage battery carried by the train, motors carried by the train operated by said storage battery, auxiliary generators, stationary batteries charged by said auxiliary generators, sectional conductors at certain points of the line where extra power is required connected to the stationary storage batteries, said sectional conductors not being electrically connected to each other, means for connecting the motors on the train with the said sectional conductors, and means for returning the current to the auxiliary generators, substantially as set forth.

4. In an electric-railway system, the combination with the train, of a secondary or storage battery carried by the train, motors carried by the train and operated by said storage battery, auxiliary generators, stationary storage batteries charged by said auxiliary generators, sectional conductors at certain points of the line where extra power is required connected to the stationary storage batteries, said sectional conductors not being electrically connected to each other, auxiliary motors on the train, means for connecting the auxiliary motors with the said sectional conductors, and means for returning the current to the auxiliary generators, substantially as set forth.

5. In an electric-railway system, the combination with the train, of motors carried by the train, a storage battery carried by the train to supply current to said motors, auxiliary motors carried by the train, stationary generators to supply the auxiliary motors with electric current, sectional conductors at certain points of the line where extra power is required, to convey the current to the auxiliary motors, a controller for said auxiliary motors and a differentially-wound solenoid to operate said controller and thereby automatically connect and disconnect the auxiliary motors with the sectional conductors, substantially as set forth.

In testimony whereof I affix my signature in presence of two witnesses.

W. N. STEWART.

Witnesses:
 CLAUDE K. MILLS,
 WM. GIRLING.